(12) United States Patent
Luttmer et al.

(10) Patent No.: US 11,647,699 B2
(45) Date of Patent: May 16, 2023

(54) TREE SAW

(71) Applicant: Dinotooth Cutter, LLC, Glencoe, OK (US)

(72) Inventors: Bernard Luttmer, Glencoe, OK (US); Kelly Coover, Galesburg, KS (US)

(73) Assignee: Dinotooth Cutter, LLC, Glencoe, OK (US)

( * ) Notice: Subject to any disclaimer, the term of this patent is extended or adjusted under 35 U.S.C. 154(b) by 0 days.

(21) Appl. No.: 16/653,086

(22) Filed: Oct. 15, 2019

(65) Prior Publication Data

US 2021/0105950 A1   Apr. 15, 2021

(51) Int. Cl.
| | | |
|---|---|---|
| *B23D 17/04* | (2006.01) | |
| *A01G 23/087* | (2006.01) | |
| *A01G 3/08* | (2006.01) | |
| *A01G 3/053* | (2006.01) | |

(52) U.S. Cl.
CPC ........... *A01G 3/088* (2013.01); *A01G 3/0535* (2013.01); *A01G 23/087* (2013.01); *B23D 17/04* (2013.01)

(58) Field of Classification Search
CPC ......... B26B 13/06; B26B 15/00; B26D 3/169; A01G 23/087; B23D 17/04
USPC ................ 30/276; 83/924, 595, 596; 144/39
See application file for complete search history.

(56) References Cited

U.S. PATENT DOCUMENTS

| | | | | |
|---|---|---|---|---|
| 28,068 | A * | 5/1860 | Day ........................... | B60L 7/10 |
| 2,212,057 | A * | 8/1940 | Waller ..................... | A01G 3/06 |
| | | | | 56/256 |
| D144,433 | S * | 4/1946 | Virze ................................. | D8/8 |
| 2,683,310 | A * | 7/1954 | Majeski ................. | A01G 3/067 |
| | | | | 30/264 |
| 2,779,325 | A * | 1/1957 | Beckham ............... | B23D 17/08 |
| | | | | 83/605 |
| 2,867,040 | A * | 1/1959 | Mertesdorf .......... | A01G 3/0535 |
| | | | | 30/240 |
| 2,976,665 | A * | 3/1961 | Speckman ............. | A01D 34/76 |
| | | | | 56/255 |
| 3,453,732 | A | 7/1969 | Wilkin | |
| 3,506,043 | A * | 4/1970 | Fulghum, Jr. ........ | A01G 23/087 |
| | | | | 144/34.5 |
| 3,618,304 | A * | 11/1971 | Hundhausen .......... | A01D 34/73 |
| | | | | 56/16.9 |

(Continued)

FOREIGN PATENT DOCUMENTS

EP    2641683 A1 *  9/2013  ............. B23D 23/00

*Primary Examiner* — Kenneth E Peterson
(74) *Attorney, Agent, or Firm* — Dunlap Codding, P.C.

(57) ABSTRACT

A tree saw attachment for a modular landscape trimmer is disclosed. In one embodiment, the tree saw attachment is provided with a drive unit having a drive shaft operably connectable to a motive source and a transmission operably connected to the drive shaft. An anvil is connected to and extending from an output side of the transmission of the drive unit, and a blade is connected to the output shaft of the transmission. The blade has an arcuate outer peripheral edge with teeth formed along a portion thereof forming a cutting edge so as the output shaft is rotated, the distance between the cutting edge and a central axis of the output shaft increases until the blade has substantially completed one rotation. Rotation of the blade causes the blade to move transversely with respect to the anvil to engage and cut material positioned between the blade and the anvil.

13 Claims, 6 Drawing Sheets

(56) References Cited

U.S. PATENT DOCUMENTS

| | | | | |
|---|---|---|---|---|
| 3,626,477 A * | 12/1971 | Fulghum, Jr. | ......... | A01G 23/087 144/34.1 |
| 3,727,504 A * | 4/1973 | Osterholt | ............. | B26D 7/2621 83/483 |
| 3,781,991 A | 1/1974 | Stretton et al. | | |
| 3,851,390 A * | 12/1974 | Neal | ..................... | A01G 3/0535 30/276 |
| 4,043,238 A * | 8/1977 | van Ham | ............. | B26D 1/0006 83/595 |
| 4,055,890 A * | 11/1977 | Seibold | .................. | A01G 3/067 30/240 |
| 4,282,910 A * | 8/1981 | Kilpela | ..................... | B27L 7/00 144/176 |
| 4,310,999 A * | 1/1982 | Onoue | ................. | B23D 61/026 30/347 |
| 4,368,610 A | 1/1983 | Aono | | |
| 4,520,619 A * | 6/1985 | Doi | ........................ | A01D 34/66 56/16.9 |
| 4,625,782 A * | 12/1986 | Jameson | ................... | B27L 7/02 144/193.1 |
| 4,706,446 A * | 11/1987 | Doi | ........................ | A01D 34/66 30/347 |
| 4,802,278 A * | 2/1989 | Vanderpol | ............. | B23D 21/08 30/101 |
| 4,890,448 A * | 1/1990 | Doi | ........................ | A01D 34/73 56/255 |
| 5,014,430 A | 5/1991 | Wortham | | |
| 5,054,276 A * | 10/1991 | Terai | ...................... | A01D 34/73 56/242 |
| 5,291,815 A * | 3/1994 | Reifenhauser | ....... | B26D 1/0006 83/596 |
| 5,331,795 A * | 7/1994 | Doi | ........................ | A01D 34/73 56/255 |
| 5,697,835 A | 12/1997 | Nitz et al. | | |
| 5,979,285 A * | 11/1999 | Rasmussen | ............... | A21C 5/00 241/295 |
| 6,105,351 A * | 8/2000 | Itoh | ........................ | A01D 34/76 30/173 |
| 7,108,451 B2 * | 9/2006 | Ewer | ........................ | E04F 21/248 404/112 |
| 7,526,885 B2 * | 5/2009 | Peterson | .................. | E02F 3/404 144/4.1 |
| 7,882,774 B1 * | 2/2011 | Bernardy | ................ | B26B 25/00 83/835 |
| 8,667,695 B2 | 3/2014 | Yamaoka et al. | | |
| D720,585 S | 1/2015 | Gardner et al. | | |
| 9,272,428 B2 * | 3/2016 | Muller | ..................... | B26D 7/08 |
| 10,149,434 B2 | 12/2018 | Martinsson | | |
| 10,625,435 B2 * | 4/2020 | Wang | ..................... | B23D 21/04 |
| 10,688,677 B2 * | 6/2020 | Xie | ..................... | B26D 1/1575 |
| 2014/0182137 A1 * | 7/2014 | Liu | ........................ | B23D 29/02 30/92 |
| 2016/0088792 A1 * | 3/2016 | Yamaoka | ............. | A01D 34/733 30/276 |
| 2016/0297500 A1 * | 10/2016 | Dubose | .................... | B60L 7/10 |
| 2018/0272445 A1 * | 9/2018 | Perkins | ................. | B23D 29/00 |
| 2020/0011400 A1 * | 1/2020 | Tory | ........................... | F16H 1/34 |

\* cited by examiner

TREE SAW

BACKGROUND

Various apparatus for felling trees are known. Examples include chain saws, rotary blades, such as circular saws, and shearing devices. Chain saws are subject to frequent failure because of the number of moving parts. Circular saws, while typically stronger and more robust, are also heavier and bulkier. Further, both chain saws and circular saws are run at high speeds with the attendant hazards from flying chips and debris. Shearing devices require enormous amounts of power and leverage to fell trees having a diameter of more than a few inches.

It would be desirable to have a tree cutting device simple to operate, economical to manufacture, easily carried and operated by a single user, able to cut trees with minimal power requirements, and able to cut trees at or below ground level leaving little to no stump profile. It is to such an apparatus that the inventive concepts disclosed herein are directed.

DETAILED DESCRIPTION OF EXEMPLARY EMBODIMENTS

The inventive concepts are generally directed to a tree saw attachment for a modular landscape trimmer. The tree saw attachment includes a drive unit with a transmission connected to a drive housing. The drive housing being a tubular structure having a drive shaft disposed within an inner bore of the tubular structure. The drive shaft operably connected to the transmission. The transmission is provided with an output shaft having a central axis passing longitudinally through a center of the output shaft. An anvil is fixedly connected to an output side of the transmission with the output shaft of the transmission passing through an aperture of the anvil and fixedly connected to a blade. The blade has an arcuate per peripheral edge with teeth formed along a portion thereof forming a cutting edge. The blade is shaped so as the output shaft is rotated the distance between the cutting edge and the central axis of the output shaft increases until the blade has substantially completed one full rotation. Rotation of the blade causes the blade to move transversely regarding the anvil to engage and cut material between the blade and anvil.

The modular landscape trimmer may provide a motive source for the tree saw attachment. The landscape trimmer may be provided with a motor operably connected to a drive shaft that passes through a bore of a tubular drive housing. The tubular drive housing may be provided with a connector designed to engage a drive housing of an attachment such as the tree saw attachment. When the modular landscape trimmer is connected to the tree saw attachment, the drive shaft of the landscape trimmer and the drive shaft of the tree saw attachment are connected so rotational motion of the motor of the landscape trimmer rotates the blade of the tree saw attachment. A gear ratio of the transmission may be selected that reduces the rotational speed of the motor so the blade is rotated one revolution-per-minute, for instance.

Before explaining at least one embodiment of the inventive concepts disclosed, it is to be understood that the inventive concepts are not limited in their application to the details of construction and the arrangement of the components or steps or methodologies in the following description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

Referring now to the drawings, and particularly to FIGS. 1-8, a tree saw 10 constructed in accordance with the inventive concepts disclosed herein is illustrated. Broadly, the tree saw 10 includes a motive source 12 and a tree saw attachment 13 comprising a drive unit 14, an anvil 16, and a blade 18.

Figure 1:
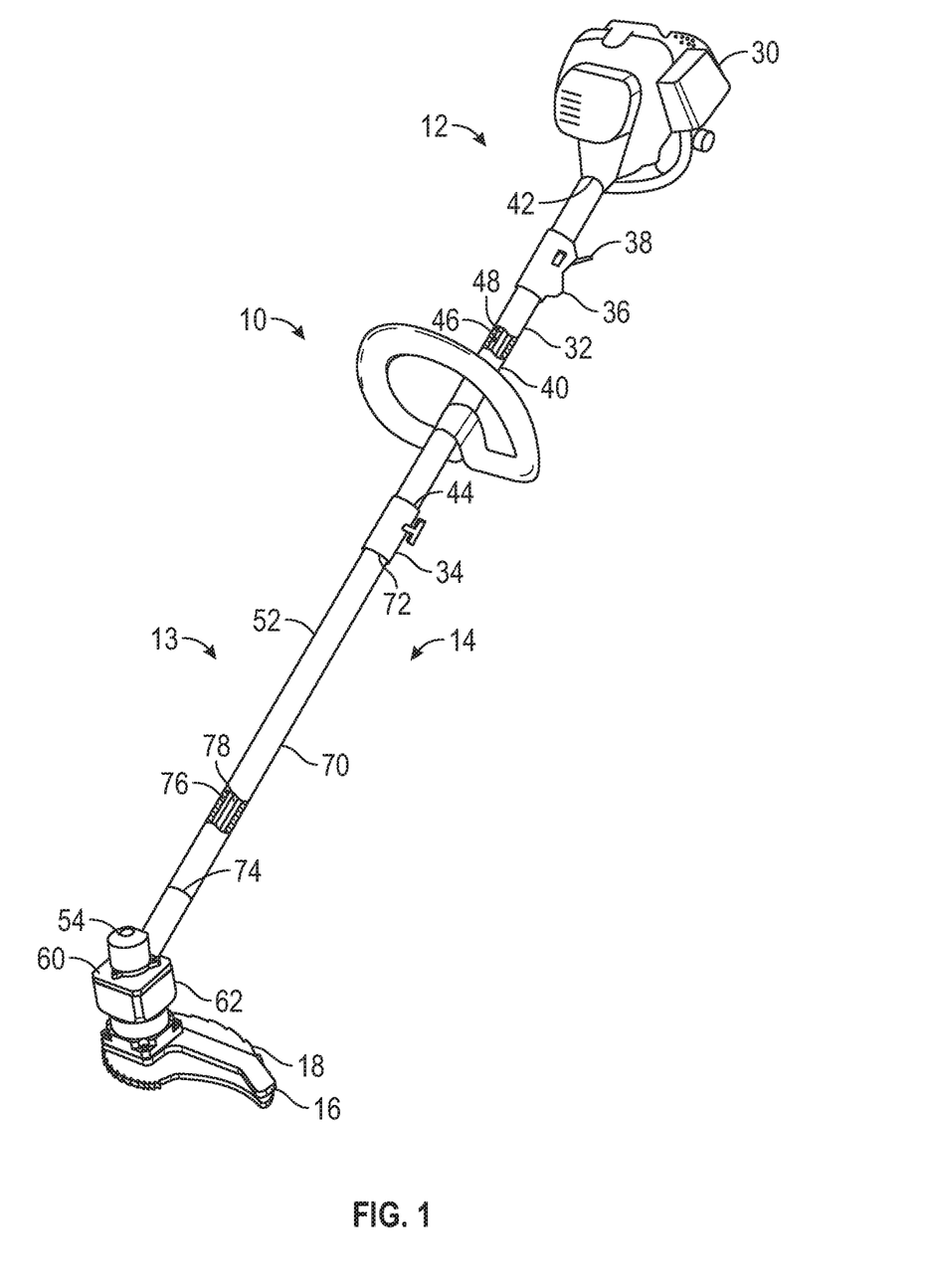
FIG. 1 is a perspective view of a tree saw constructed in accordance with the inventive concepts disclosed herein.

The motive source 12 is provided with a motor 30, a first drive housing 32, an integrated power take-off coupling 34, a handle 36, and a control switch 38.

The motor 30, for example, may be a high torque DC motor, a reversing gear motor, an electric motor, a gasoline- or biofuel-powered internal combustion engine, a solar-powered motor, and the like.

The first drive housing 32 of the motive source 12 may be a tubular housing 40 having a first end 42, a second end 44, and a bore 46 that extends from the first end 42 to the second end 44. The motor 30 is connected to the first end 42 of the first drive housing 32 and the integrated power take-off coupling 34 is connected to the second end 44 of the first drive housing 32.

A first drive shaft 48 is connected to the motor 30 and is concentrically surrounded by and extends through the bore 46 to the power take-off coupling 34. The power take-off coupling 34 facilitates connection of the motive source 12 to the tree saw attachment 13 as will be explained further herein.

The handle 36 may be a separate component of the first drive housing 32 or may be integral to it. The handle 36 may have a high friction hand grip surface, similar to or distinct from that of the first drive housing 32. The handle 36 may be ergonomically shaped.

The control switch 38 may be disposed in the handle 36. The control switch 38 may turn power on or off to or control the speed of the motor 30. The control switch 38 may be a power switch, a module trigger, a module modulation switch, a module speed control, and the like.

Figure 2:
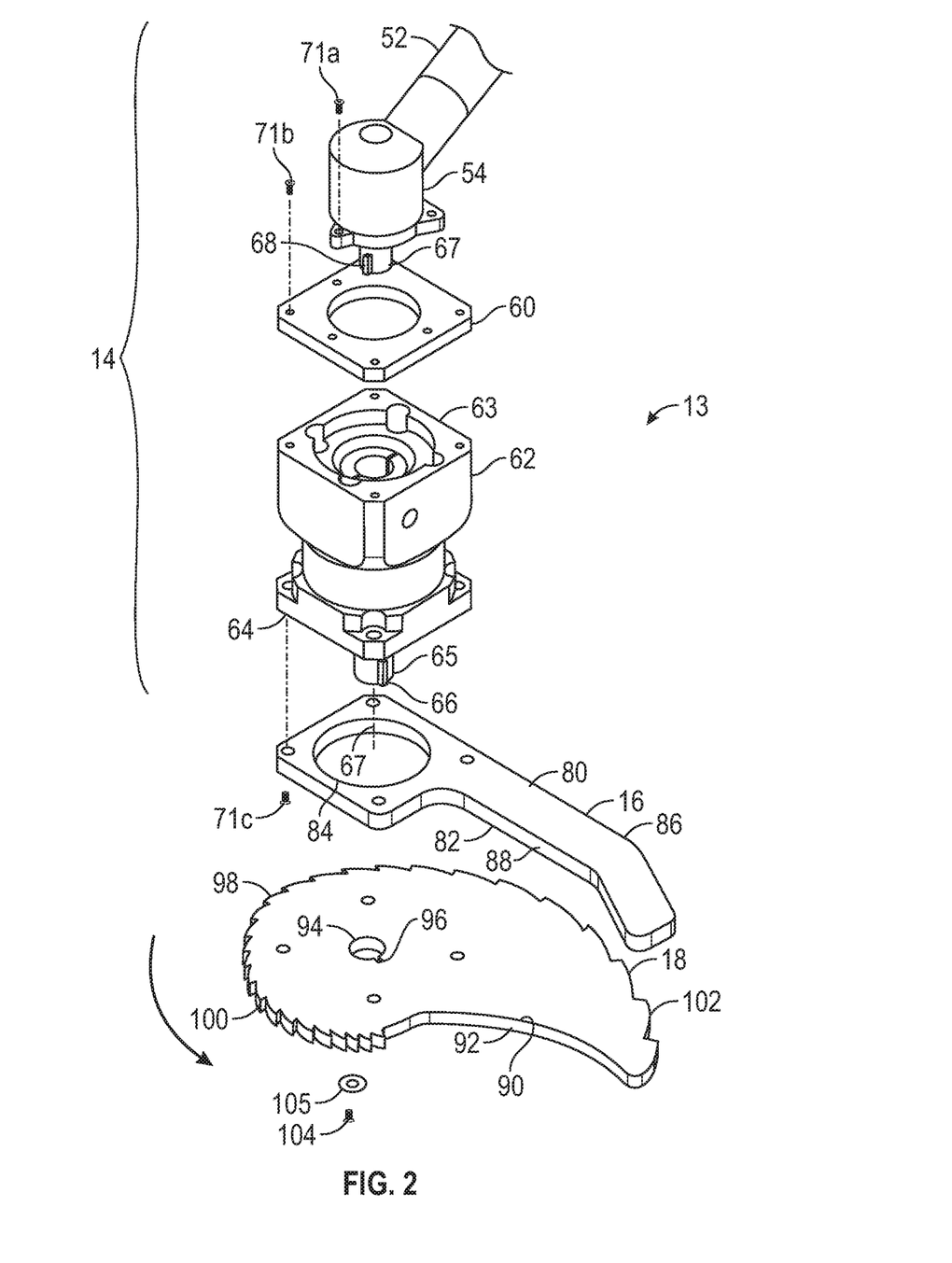
FIG. 2 is an exploded, perspective view of a tree saw attachment constructed in accordance with the inventive concepts disclosed herein.

The drive unit 14 of the tree saw attachment 13 is provided with a second drive housing 52, a drive head 54, a connector plate 60, and a transmission 62.

The transmission 62 has an input side 63, an output side 64, an output shaft 65, and a key 66. The output shaft 65 of the transmission 62 has a central axis 67 that extends longitudinally through a center of the output shaft 65. The transmission 62 may be a speed reduction gearbox and/or be provided with speed selection.

The drive head 54 is provided with an output shaft 67 and a key 68. The drive head 54 may contain components such as a gearbox (not shown), gearset (not shown), ring bevel gear (not shown), pivot axis (not shown), coupling (not shown), or the like.

The drive head 54 is connected to the input side 63 of the transmission 62 with the mounting plate 60. The output shaft 67 of the drive head 54 extends through the mounting plate 60 and operably engages the transmission 62. The mounting plate 60 may be connected to the drive head 54 and the input side 63 of the transmission 62 by connecting members 71*a* and 71*b*, such as screws, nuts and bolts, rivets, an interference locking system, a threaded connection, a sliding attachment, a hinge, a clamp, a tab, a spring-loaded attachment, a sleeve attachment, and the like.

The second drive housing 52 of the drive unit 14 is provided with a tubular housing 70, a first end 72, a second end 74, and a bore 76 that extends from the first end 72 to the second end 74. A second drive shaft 78 is concentrically surrounded by the bore 76 of the second drive housing 52 and extends from the first end 72 to the second end 74.

The drive head 54 is connected to the second end 74 of the second drive housing 52. The output shaft 67 of the drive head 54 is connected to the second drive shaft 78 disposed within the second drive housing 52. When the second drive housing 52 of the drive unit 14 is connected to the first drive housing 32 of the motive source 12, the second drive shaft 78 is operably connected with the first drive shaft 48 to transmit rotational motion from the motive source 12 to the transmission 62.

Figure 4:
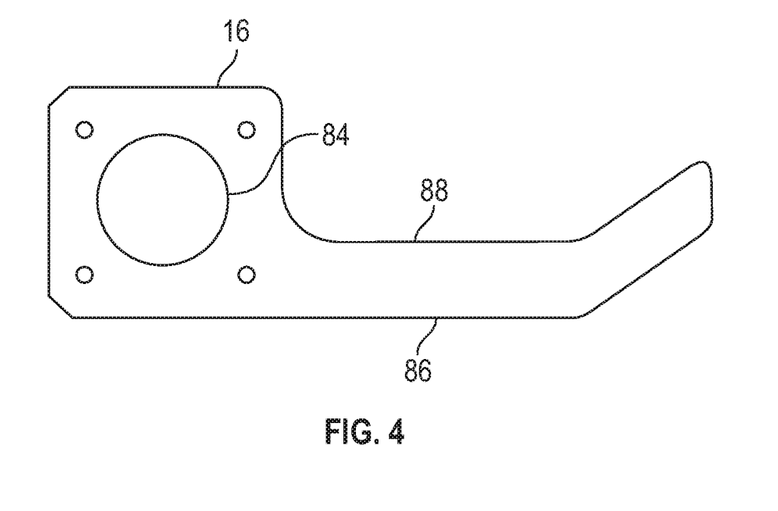
FIG. 4 is a top plan view of an anvil of the tree saw attachment of FIG. 2.
Figure 5:
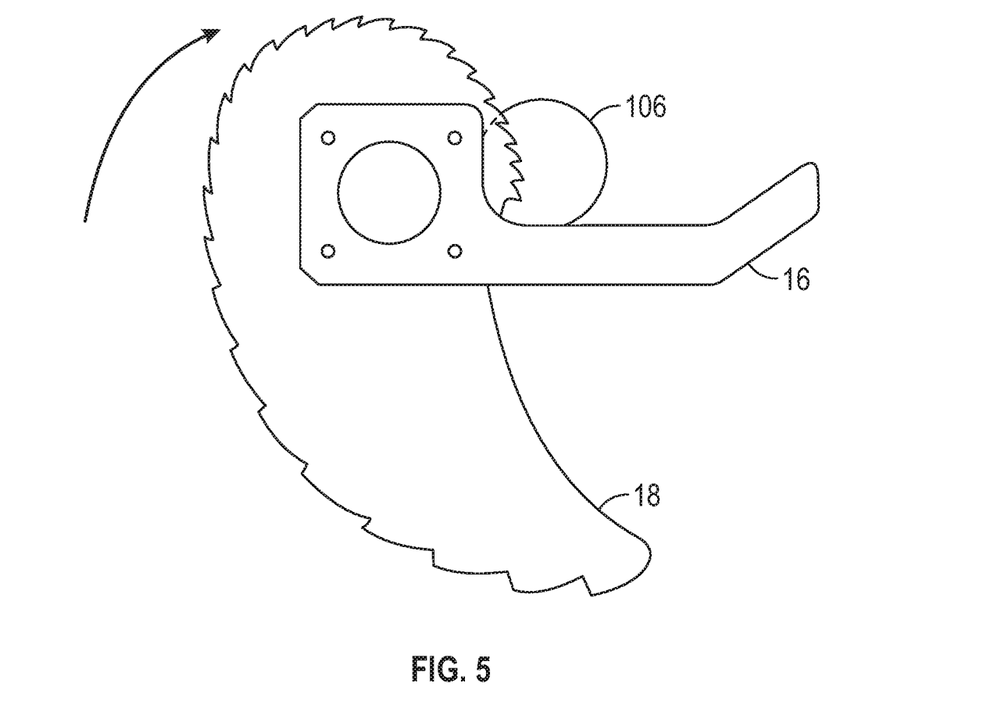
FIGS. 5-8 are top plan views showing the blade in relation to the anvil as material is being cut.
Figure 6:
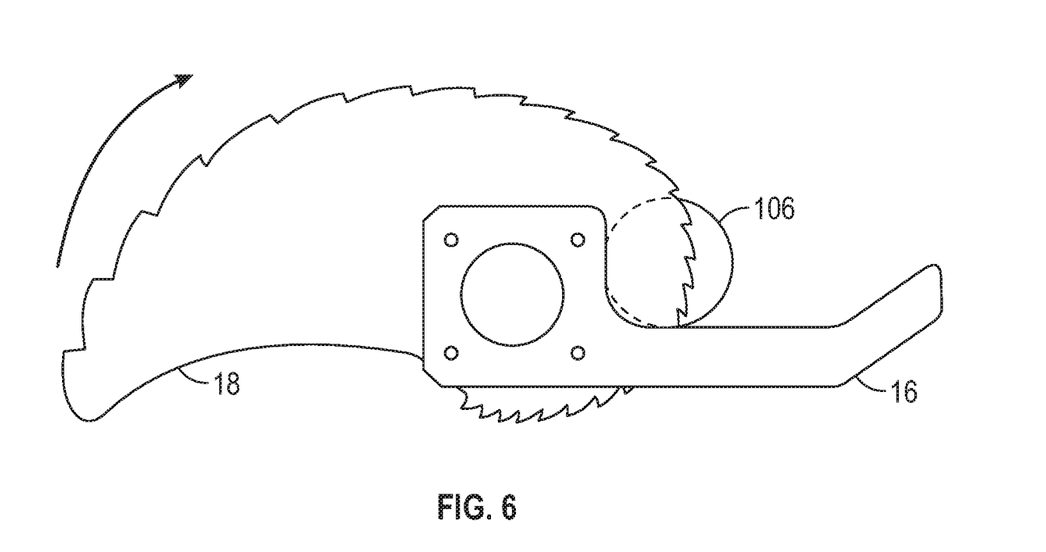
Figure 7:
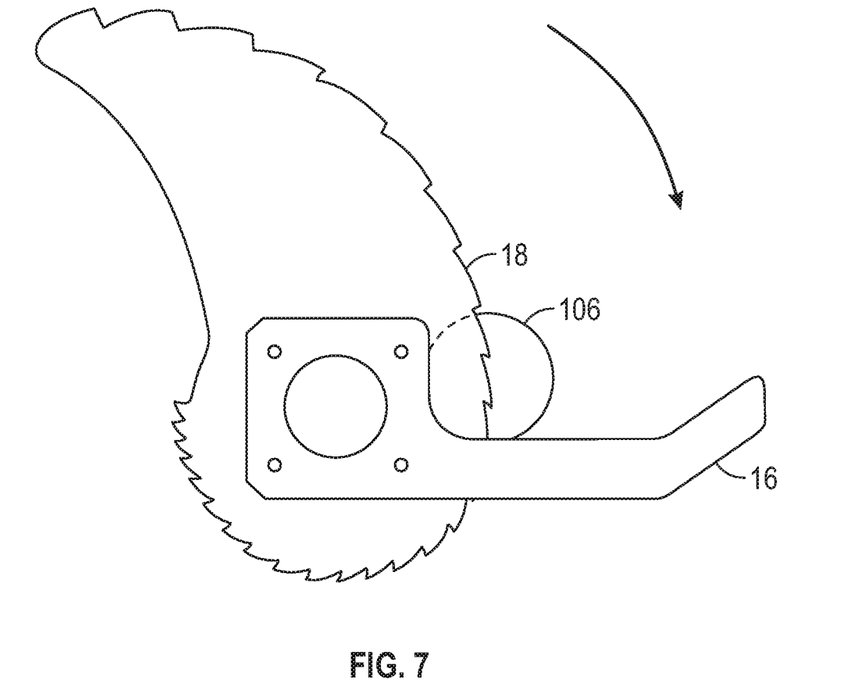
Figure 8:
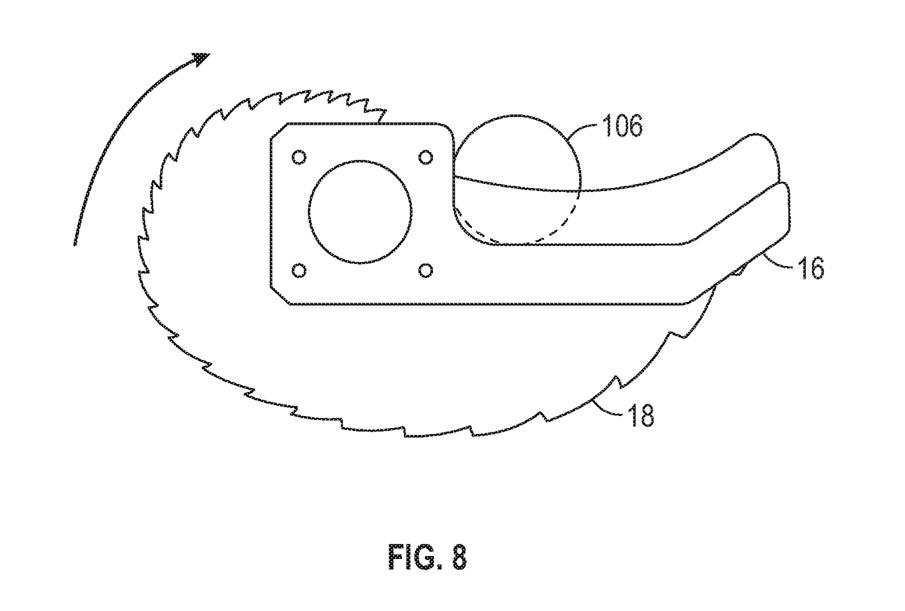

The anvil 16 of the tree saw attachment 13 has a first side 80, a second side 82 opposite the first side 80, an aperture 84 extending from the first side 80 to the second side 82, and an arm 86 having an arcuate edge 88. The first side 80 of the anvil 16 is mated with and attached to the output side 64 of the transmission 62. The anvil 16 may be connected to the output side 64 of the transmission 62 using connecting members 71*c*, such as screws, nuts and bolts, rivets, an interference locking system, a threaded connection, a sliding attachment, a hinge, a clamp, a tab, a spring-loaded attachment, a sleeve attachment, and the like.

The arcuate edge 88 of the arm 86 is sized and shaped to direct and confine material to be cut, such as a tree 106 (FIGS. 5-8), for example, between the arm 86 of the anvil 16 and the blade 18.

Figure 3:
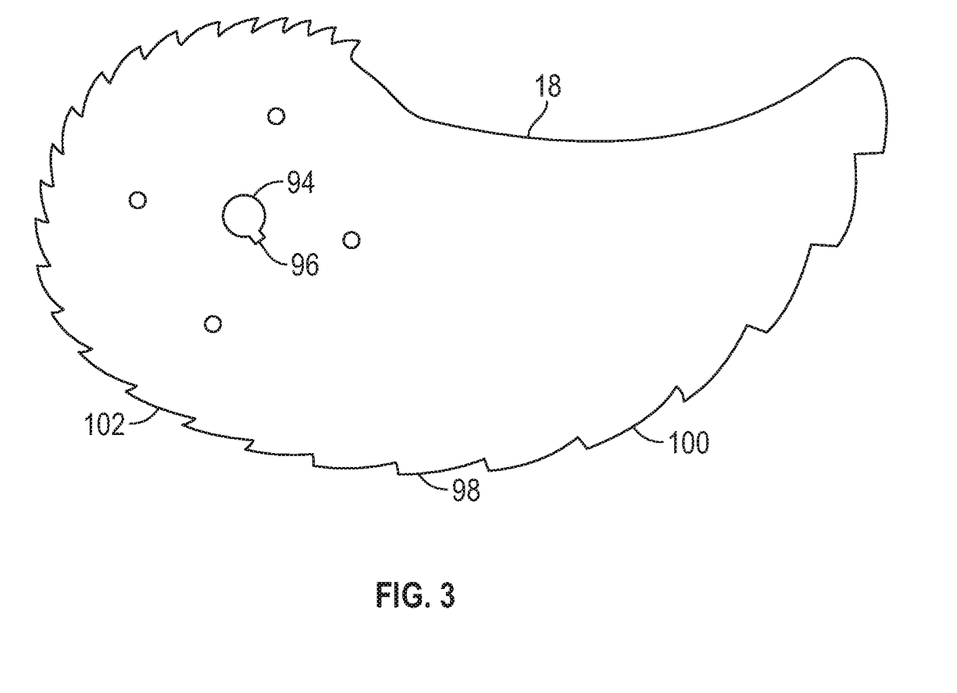
FIG. 3 is a top plan view of a blade of the tree saw attachment of FIG. 2.

The blade 18 has a first side 90, a second side 92, an aperture 94 extending between the first side 90 and the second side 92, a keyway 96 extending between the first side 90 and the second side 92 in communication with the aperture 94, an arcuate outer peripheral edge 98 with teeth 100 formed along a portion thereof forming a cutting edge 102. The blade 18 is connected to the output shaft 65 of the transmission 62 and fixed rotationally by the key 66 inserted in the keyway 96. The blade 18 may be secured to the output shaft 65 using connector 104 and washer 95. For example, connector 104 may be a screw, a bolt, rivets, an interference locking system, a threaded connection, a spring-loaded attachment, a sleeve attachment, and the like.

In one embodiment, the cutting edge 102 forms a portion of a logarithmic spiral often referred to as a golden spiral. In geometry, a golden spiral is a logarithmic spiral whose growth factor is φ (1.618), the golden ratio. That is, a golden spiral gets wider (or further from its origin) by a factor of φ for every quarter turn it makes. In this embodiment, the logarithmic spiral begins at a center of the aperture 94 of the blade 18 and the cutting edge 102 is forms a portion of the logarithmic spiral.

As illustrated in FIGS. 5-8, rotation of the blade 18 causes the blade 18 to move transversely regarding the anvil 16 to engage and cut material, such as the tree 106, positioned between the blade 18 and anvil 16. The arcuate peripheral edge 108 is shaped so as the output shaft 65 of the transmission 62 is rotated, the distance between the cutting edge 102 and the central axis 67 of the output shaft 65 increases until the blade 18 has substantially completed one rotation.

Figure 9:
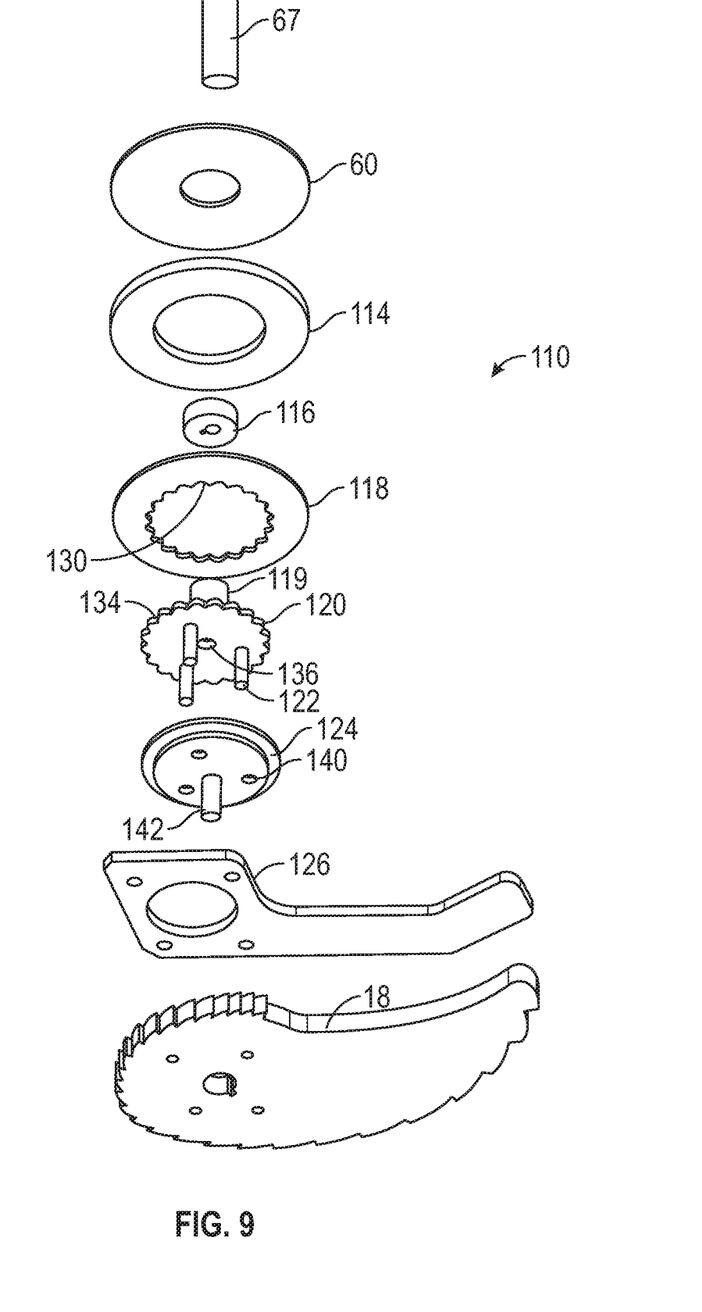
FIG. 9 is an exploded, perspective view of another embodiment of a tree saw attachment constructed in accordance with the inventive concepts disclosed herein.

Referring now to FIG. 9, another embodiment of a tree saw attachment 13*a* is illustrated. The tree saw attachment 13*a* is similar to the tree saw attachment 13, except the tree saw attachment 13*a* has a transmission 110 in the form of a cycloid drive. As described above, the drive head 54 is provided with output shaft 67 which may be operably connected to a motive source, such as the motive source 12. A mount 102 may connect the drive head 54 to the transmission 110.

The transmission 110 may be provided with a first housing 114, an eccentrically shaped cam 116, a ring gear 118, a bearing 119, a sun gear 120 having a plurality of pins 122 (only one of which numbered in FIG. 9), an output mount 124, a second housing 126 which forms an anvil as described above. and a blade 118.

The ring gear 118 may be provided with a plurality of teeth 130 (only one of which numbered in FIG. 9) extending around an inner edge of the ring gear 118. The sun gear 120 may be provided with a plurality of teeth 134 (only one of which numbered in FIG. 9) extending around a peripheral edge and an aperture 136 extending through the sun gear 120 sized to receive the bearing 119. The teeth 130 of the ring gear 118 are sized to receive and engage with the teeth 134 of the sun gear 120.

The cam 116 fits within and rotates feely inside the bearing 119. Rotation of the cam 116 by the output shaft 67 causes the sun gear 120 to rotate inside the ring gear 118 fixedly connected to the first housing 114. The eccentrically shaped cam 116 keeps at least one of the teeth 134 of the sun gear 120 engaged with at least one of the teeth 130 of the ring gear 118. For the purposes of illustration, where the teeth 134 of the sun gear 120 and the teeth 130 of the ring gear 118 engage will be referred to as a contact point. As the output shaft 67 rotates clockwise, for instance, the contact point follows this motion causing the sun gear 120 to rotate inside the ring gear 118. Because a circumference of the sun gear 120 is smaller than that of the ring gear 118, any point on a surface of the sun gear 120 will effectively slowly rotate counterclockwise.

The output mount 124 may be provided with a plurality of apertures 140 (only one of which is numbered in FIG. 9) extending through the output mount 114 and an output shaft 142. The apertures 140 are larger than a diameter of the pins 122 of the sun gear 120 and sized so that when the pins 122 are inserted in the apertures 140 and the sun gear 120 is rotated, at least a portion of an outer surface of each of the pins 122 remains in contact with a wall of the apertures 140 so the cycloid motion of the sun gear 120 is translated into circular motion of the output mount 124. Thus, the output mount 124 achieves a steady rotation from the wobbly movement of the sun gear 120.

The output shaft 142 extends through the second housing 126 and connects to the blade 18 as described above.

Either the transmission 62 or the cycloid drive 110 may be used as part of the tree saw attachment 13. In either case, a gear ratio may be selected to convert the high input speed of a motor such as the motor of a landscape trimmer to a slow output speed. Using a motor with an output rotation per minute (RPM) of 3600 as an example, a gear ratio of 3600:1 may be selected to reduce the RPM to 1. This way, higher torque can be achieved from a relatively light weight, high speed motor to allow the tree saw 10 to be easily carried and operated by a single user. The gear ratio of N:1 is used herein for example only and other gear ratios may be selected depending on a particular application.

From the above description, it is clear that the inventive concepts disclosed herein is well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. A tree saw attachment, comprising:
   a drive unit having a drive shaft operably connectable to a motive source and a transmission operably connected to the drive shaft, the transmission having an input side, an output side, and an output shaft extending from the output side, the output shaft having a central longitudinal axis and being rotatable by rotation of the drive shaft in a cutting direction of rotation of 360 degrees;
   an anvil connected to the output side of the transmission of the drive unit and having an arm with a free end extending laterally away from the central longitudinal axis of the drive shaft and the output side of the transmission in a way the arm is laterally positionable against a tree extending upwardly from a ground surface; and
   a blade connected to the output shaft of the transmission, the blade having an outer peripheral edge with a plurality of teeth formed along a portion thereof forming a cutting edge, each of the teeth having a tip, the tip of each of the teeth being a radial outermost part of the blade in a plane defined by the tip and the central longitudinal axis of the output shaft, the cutting edge having a first end and a second end, the distance between each t of the teeth of the cutting edge increasing from the first end of the cutting edge to the second end of the cutting edge and the distance between each t of the teeth of the cutting edge and the central longitudinal axis of the output shaft increasing from the first end of the cutting edge to the second end of the cutting edge,
   wherein each of the teeth is oriented toward the cutting direction of rotation, and
   wherein rotation of the blade in the cutting direction of rotation causes the blade to move transversely with respect to the anvil so the teeth engage and cut the tree extending upwardly from the ground surface and positioned between the blade and the anvil.

2. The tree saw attachment of claim 1, wherein the cutting edge is spiral shaped.

3. The tree saw attachment of claim 1, wherein the transmission has a gear ratio configured to rotate the blade one revolution per minute.

4. The tree saw attachment of claim 1, wherein the transmission comprises a cycloid gearing.

5. The tree saw attachment of claim 4, wherein the transmission has a gear ratio configured to rotate the blade one revolution per minute.

6. A tree saw, comprising:
   a motive source comprising a first drive shaft; and
   a tree saw attachment connected to the motive source, the tree attachment comprising:
      a drive unit having a second drive shaft operably connected to the first drive shaft of the motive source and a transmission operably connected to the second drive shaft, the transmission having an input side, an output side, and an output shaft extending from the output side, the output shaft having a central longitudinal axis and being rotatable by rotation of the second drive shaft in a cutting direction of rotation of 360 degrees;
      an anvil connected to the output side of the transmission of the drive unit and having an arm with a free end extending laterally away from the central longitudinal axis of the drive shaft and the output side of the transmission in a way the arm is laterally positionable against a tree extending upwardly from a ground surface; and
      a blade connected to the output shaft of the transmission, the blade having an outer peripheral edge with a plurality of teeth formed along a portion thereof forming a cutting edge, each of the teeth having a tip, the tip of each of the teeth being a radial outermost part of the blade in a plane defined by the tip and the central longitudinal axis of the output shaft, the cutting edge having a first end and a second end, the distance between each t of the teeth of the cutting edge increasing from the first end of the cutting edge to the second end of the cutting edge and the distance between each t of the teeth of the cutting edge and the central longitudinal axis of the output shaft increasing from the first end of the cutting edge to the second end of the cutting edge,
      wherein each of the teeth is oriented toward the cutting direction of rotation, and
      wherein rotation of the blade in the cutting direction of rotation causes the blade to move transversely with respect to the anvil so the teeth engage and cut the tree extending upwardly from the ground surface and positioned between the blade and the anvil.

7. The tree saw of claim 6, wherein the cutting edge is spiral shaped.

8. The tree saw of claim 6, wherein the transmission has a gear ratio configured to rotate the blade one revolution per minute.

9. The tree saw of claim 6, wherein the transmission comprises a cycloid gearing.

10. The tree saw of claim 9, wherein the transmission has a gear ratio configured to rotate the blade one revolution per minute.

11. The tree saw of claim 6, wherein the motive source further comprises:
   a motor operably coupled to the first drive shaft;
   an elongated drive housing in which the first drive shaft is housed, the drive housing having a first end connected to the motor and a second end connected to the drive unit.

12. The tree saw of claim 11, wherein the motive source further comprises a handle extending from the drive housing.

13. The tree saw of claim 11, wherein the elongated drive housing is a first drive housing and the drive unit further comprises an second elongated drive housing in which the second drive shaft is housed, the second drive housing of the drive unit having a first end connected to the second end of the first drive housing of the motive source and a second end connected to the input end of the transmission.

* * * * *

UNITED STATES PATENT AND TRADEMARK OFFICE
CERTIFICATE OF CORRECTION

| | | |
|---|---|---|
| PATENT NO. | : 11,647,699 B2 | Page 1 of 1 |
| APPLICATION NO. | : 16/653086 | |
| DATED | : May 16, 2023 | |
| INVENTOR(S) | : Bernard Luttmer and Kelly Coover | |

It is certified that error appears in the above-identified patent and that said Letters Patent is hereby corrected as shown below:

In the Claims

Column 6, Line 3, in Claim 1: Delete "t" and replace with -- tip --

Column 6, Line 6, in Claim 1: Delete "t" and replace with -- tip --

Column 6, Line 19, in Claim 2: Delete "edge is spiral shaped." and replace with -- edge forms a portion of a golden spiral. --

Column 6, Line 56, in Claim 6: Delete "t" and replace with -- tip --

Column 6, Line 59, in Claim 6: Delete "t" and replace with -- tip --

Column 7, Lines 3-4, in Claim 7: Delete "edge is spiral shaped." and replace with -- edge forms a portion of a golden spiral. --

Signed and Sealed this
Twentieth Day of June, 2023

*Katherine Kelly Vidal*

Katherine Kelly Vidal
*Director of the United States Patent and Trademark Office*